United States Patent
Takasugi

Patent Number: 5,245,475
Date of Patent: Sep. 14, 1993

[54] IMAGING OPTICAL SYSTEM FOR ENDOSCOPES

[75] Inventor: Yoshiharu Takasugi, Iruma, Japan

[73] Assignee: Olympus Optical Co., Ltd., Tokyo, Japan

[21] Appl. No.: 710,367

[22] Filed: Apr. 26, 1991

[30] Foreign Application Priority Data

Apr. 27, 1990 [JP] Japan .................... 2-110096

[51] Int. Cl.$^5$ .......................... G02B 15/14
[52] U.S. Cl. ...................... 359/690; 359/689
[58] Field of Search .................. 359/690, 689

[56] References Cited

U.S. PATENT DOCUMENTS

| | | | |
|---|---|---|---|
| 4,312,572 | 1/1982 | Yamashita et al. | 359/690 X |
| 4,781,448 | 11/1988 | Chatenever et al. | 359/701 |
| 4,874,232 | 10/1989 | Hasegawa | 359/690 |

FOREIGN PATENT DOCUMENTS 1128031  5/1989  Japan .

Primary Examiner—Scott J. Sugarman
Attorney, Agent, or Firm—Cushman, Darby & Cushman

[57] ABSTRACT

An imaging optical system for endoscopes used for re-imaging an image formed by endoscopes, comprising in the order from the object side a first lens unit which has a positive refractive power and a focusing function, a second lens unit which has a negative refractive power and is moved in a definite direction along the optical axis so as to progressively enhance magnification of the imaging optical system when the optical system is zoomed from the wide position to the tele position, and a third lens unit which has a positive refractive power and is moved along the optical axis so as to keep the image point constant regardless of variation of focal length, said first lens unit being adapted as to be moved independently of the other lens units for varying diopteric power within a positive-to-negative range taking the diopter at the infinite object distance for the imaging optical system as zero.

9 Claims, 12 Drawing Sheets

WIDE POSITION

INTERMEDIATE FOCAL LENGTH

TELE POSITION

WIDE POSITION

INTERMEDIATE FOCAL LENGTH

IMAGING OPTICAL SYSTEM FOR ENDOSCOPES

BACKGROUND OF THE INVENTION a) Field of the Invention

The present invention relates to a zoom type imaging optical system which is to be used in a condition where it is connected to an eyepiece of an endoscope.

b) Description of the Prior Art

It is generally practiced to connect TV cameras or film cameras to eyepieces of endoscopes for performing diagnosis by observing images which are formed by the endoscopes and projected onto the TV cameras or recorded on the films. In the recent days, it is widely practiced to perform medical diagnosis and treatments while observing images which are formed by endoscopes and projected onto TV monitors by using small TV cameras, especially those incorporating the solid-state image pickup devices such as CCD.

Since the solid-state image pickup devices are designed very small and highly integrated by the recent progress made in the field of the semiconductor technology, the imaging optical systems to be used in combination with the solid-state image pickup devices must have high performance.

FIG. 1 shows a configuration of a system for observing an image formed by an endoscope on a TV monitor. In this drawing, an eyepiece 2 of an endoscope 1 incorporating an objective lens system 1, an image guide (image transmitting optical system), etc. is connected to an adapter 3 having an imaging optical system 4 and a TV camera 5 having a solid-state image pickup device 6, which in turn is connected to a camera control unit 7 and a monitor 8.

In the system having the configuration described above, an image of object formed by the eyepiece 2 arranged in the endoscope 1 is focused onto the solid-state image pickup device 6 by the imaging optical system 4 built in the adapter 3 and electric signals provided from the solid-state image pickup device are processed by the camera control unit 7 so that the image is projected onto the monitor 8 for observation.

For observation of images formed by the system shown in FIG. 1, several kinds of adapters having different magnifications are prepared so that they are to be used selectively dependently on types of endoscopes to be employed and purposes of observations. Therefore, the system requires a multiple number of adapters and a high manufacturing cost. In addition, when it is desired to observe an image at different magnifications, the system requires exchanging the adapters each time the magnification is to be changed from one to another though it is rather difficult, for example during medical operation, to exchange the adapters from one to another. Even when the adapters can be exchanged during the medical operation, it will be difficult to project an image at the size desired by the surgical operator.

In order to correct the defect described above, imaging optical systems of adapters are designed as zoom optical systems so as to permit freely change sizes of images of locations to be observed on the TV monitor.

On the other hand, most eyepiece lens systems for a definite type of endoscopes are designed so as to have a certain definite imaging point, or a fixed dioptric power when connected to adapters.

When a zoom imaging optical system is combined with eyepiece lens systems for endoscopes having a certain definite diopter, object points for the adapter are located at the same position since the eyepiece lens systems have the same dioptric power. Accordingly, the zoom imaging optical system requires no focusing as exemplified by the zoom imaging optical system disclosed by Japanese Patent Kokai Publication No. Hei 1-128031.

However, eyepiece lens systems for endoscopes such as non-flexible endoscopes have dioptric powers which are different dependently on types of the endoscopes.

When the zoom imaging optical system is to be combined with eyepiece lens systems for endoscopes having different dioptric powers, it is necessary to equip the zoom imaging optical system with a focusing mechanism.

As a method for focusing the zoom imaging optical system, there is known the method adopted by the optical system disclosed by U.S. Pat. No. 4,781,448 which moves the optical system as a whole along the optical axis for focusing. This focusing method allows the moving distance to be changed along with variation of focal length of the optical system caused by focusing. When an eyepiece lens system having a different dioptric power is combined with the zoom imaging optical system, moving distance of a lens unit required for adjusting dioptric power is variable dependently on magnification of the latter. When the focal length at the tele position of the imaging optical system is twice as long as that at the wide position thereof, for example, the moving distance of the lens unit required for adjusting the same number of diopters is prolonged four times as long. Therefore, it is necessary to reserve wide airspaces before and after the optical system, thereby enlarging the adapter as a whole.

Further, since numbers of diopters to be adjusted varies along with variation of magnification of the zoom imaging optical system, it is impossible to adopt a scale or a similar member for indicating numbers of diopters to be adjusted. Therefore, it is impossible to know the moving distance of the movable lens unit required for focusing an endoscope even when the imaging optical system is combined with an eyepiece lens system for endoscopes having a known dioptric power, thereby obliging it to perform focusing the endoscope while observing an actual image on the TV monitor.

Furthermore, since the adapter incorporating the zoom imaging optical system must be as small as possible in its external design and as light as possible in its weight since the adapter is connected to endoscopes and operated integrally therewith. Such compact design is important not only from the viewpoint of operation but also for lessening the fatigue of the operator.

There is currently available an endoscope which is composed, as shown in FIG. 2, of an observation system consisting of an objective lens system 11 and an image transmitting system such as an image guide 12, and an illumination system comprising a light guide 13, but equipped with no eyepiece lens system.

The endoscope of this type which is equipped with no eyepiece lens system can be manufactured at a low cost, and is preferrable especially for the medical field since it can be discarded, once it is used, to assure excellent hygenical effect. In order to project an image formed by the endoscope of this type onto a TV monitor, it is necessary to equip the endoscope with a lens which has the function equivalent to that of an eyepiece lens system.

SUMMARY OF THE INVENTION

A primary object of the present invention is to provide a high performance imaging optical system for endoscopes which is used in a condition attached to eyepiece lens systems of endoscopes, is capable of changing sizes of images formed by the endoscopes as desired, equipped with a mechanism permitting focusing the endoscopes properly in accordance with dioptric powers of the eyepiece lens systems thereof, simple in composition, compact in external design, and light in weight, operable in simple procedures and sufficiently compatible with highly integrated image pickup devices.

The image pickup system incorporating the imaging optical system for endoscopes according to the present invention comprises an objective lens system, an image transmitting optical system for transmitting an image formed by the objective lens system to a predetermined location and the imaging optical system which is arranged after an eyepiece lens system of an endoscope for reimaging an image formed by said endoscope equipped with said eyepiece lens system. The imaging optical system comprises, in the order from the object side, a first positive lens unit having a focusing function, a second lens unit which has a negative refractive power and is moved in a definite direction along the optical axis so as to progressively enhance magnification of the imaging optical system when the optical system is zoomed from the wide position to the tele position, and a third lens unit which has a positive refractive power and is movable along the optical axis so as to keep the image point constant regardless of the zooming, said first lens unit being movable along the optical axis, independently of the other lens units, so as to permit focusing endoscopes which are equipped with eyepiece lens systems having dioptric powers varying within a positive-to-negative range, taking the diopter at the infinite object distance for the imaging optical system as zero.

When the first lens unit which is to be arranged right after eyepiece lens systems of endoscopes to be connected to an optical system is selected as the focusing lens unit, as in the case of the imaging optical system according to the present invention, it is possible to adjust dioptric power (or focus the endoscopes) by moving the focusing lens unit for a certain definite distance corresponding to a variation of dioptric powers of the eyepiece lens systems of the endoscopes independently of the zoomed positions such as wide position and tele position. Therefore, once an endoscope is brought into focus by moving the focusing lens unit at an optional magnification of the imaging optical system, it is possible to change size of an image as desired by zooming the imaging optical system and no diopter adjustment is necessary after the zooming.

When a focusing lens unit is arranged after a vari-focal lens system, for example, focused condition is affected by zooming the vari-focal system and it is necessary to perform focusing dependently not only on variation of dioptric powers of eyepiece lens systems of endoscopes but also on variation of zoomed conditions. Moreover, moving distance of the focusing lens unit is variable dependently on zoomed conditions.

Since the imaging optical system according to the present invention selects the first lens unit which is arranged before the vari-focal lens system as the focusing lens unit, the optical system eliminates the necessity to perform focusing at each zoomed condition, and since the moving distance for focusing remains unchanged independently on zoomed conditions, the imaging optical system according to the present invention can shorten the moving distance of the focusing lens unit, enables to provide a scale for diopter adjustment on a lens barrel and makes it possible to compose an image pickup system which can be operated conveniently.

Further, the imaging optical system according to the present invention consists of the three lens units, has the simple composition and can be designed compact. The three lens units have functions independent of one another, i.e., the first lens unit, the second lens unit and the third lens unit are designed as the focusing lens unit, variator and compensator respectively, thereby making it possible to simplify the mechanism for moving the lens units, the structure of the lens barrel and so on. Though it is possible to impart the function of the compensator to the first lens unit, such a design is undesirable from the viewpoint of the structure of the lens barrel since it will require two cams for moving the first lens unit and complicate the structure of the moving mechanism.

Furthermore, one of characteristics of the imaging optical system according to the present invention lies in that it permits adjusting dioptric power within a positive-to-negative range. Certain eyepiece lens systems for endoscopes are designed so as to have negative dioptric powers, whereas others for positive dioptric powers. The imaging optical system according to the present invention is compatible not only with endoscopes equipped with eyepiece lens systems having negative dioptric powers but also those equipped with eyepiece lens systems having positive dioptric powers. Embodiments of the present invention to be described later are designed so as to permit adjusting diopters within a range from $-11.3$ to $+6.8$.

FIG. 3 shows a diagram illustrating the fundamental composition of the imaging optical system according to the present invention. As is seen from this drawing, distance $l_1$ as measured from the first lens unit to an image formed by the imaging optical system is expressed by the following formula (i):

$$l_1 = l + S_{F'} = f_1 - \left(2 + \beta_2 + \frac{1}{\beta_2}\right)f_2 + \left(2 + \beta_3 + \frac{1}{\beta_3}\right)f_3 \tag{i}$$

wherein the reference symbols $f_1$, $f_2$ and $f_3$ represent the focal lengths of the first lens unit $L_1$, the second lens unit $L_2$ and the third lens unit $L_3$ respectively, and the reference symbols $\beta_2$ and $\beta_3$ designate the magnifications of the second lens unit and the third lens unit respectively.

In order to obtain the minimum value of $l_1$ expressed by the above-mentioned formula (i), it is necessary to shorten the focal length of each of the lens units, and reduce the values of the terms related to $\beta_2$ and $\beta_3$.

Examinations will be made here on the terms related to the magnifications.

Let us consider, for simplicity, formation of an image by a lens L shown in FIG. 4. When the distance as measured from the lens L to an object 0 is represented by $D_1$ and the distance as measured from the lens L to an image formed by this lens is designated by $D_2$, the distance IO as measured from the object to the image is expressed by the following formula (ii):

$$IO = D_1 + D_2 = f\left(2 + \beta + \frac{1}{\beta}\right) \quad \text{(ii)}$$

wherein the reference symbol f represents the focal length or the lens L and the reference symbol $\beta$ designates the imaging magnification of the lens L.

FIG. 5 shows a curve illustrating the relationship between the distance IO and the imaging magnification $\beta$ in absolute values, with the signs ignored, which are obtained on the basis of the formula (ii). FIG. 5 gives, for a lens having an optional focal length, the minimum value of the distance IO when the magnification $\beta$ has a value of 1. Further, it will be understood from FIG. 5 that the variation of the distance IO to be caused due to variation of the imaging magnification $\beta$ can be minimized by setting this magnification so that it has a maximum value larger than 1 and a minimum value smaller than 1, and the distance IO at the maximum imaging magnification is equal to that at the minimum imaging magnification.

By applying the relationship described above to the imaging optical system shown in FIG. 3, it will be understood that the distance IO can be minimized by designing the second lens unit so as to have the following magnification $\beta_2$:

$$\beta_{2W} = 1/\sqrt{z} \text{ and } \beta_{2T} = \sqrt{z}$$

wherein the reference symbols $\beta_{2W}$ and $\beta_{2T}$ represent the magnifications of the second lens unit at the wide position and the tele position respectively, and the reference symbol z designates the zooming ratio of the imaging optical system.

Accordingly, it is therefore desirable to design the second lens unit so as to have a magnification range of $1\sqrt{z}\text{-}23\text{ -}62\text{ }_2 \leq \sqrt{z}$.

Further, when the focal length of the first lens unit $L_1$ is represented by $f_1$, and the magnifications of the second lens unit L and the third lens unit $L_3$ are designated by $\beta_2$ and $\beta_3$ respectively, the total focal length of the imaging optical system is expressed as follows:

$$f = f_1 \cdot \beta_2 \cdot \beta_3$$

A desirable range of the magnification $\beta_2$ can be determined as described above once a zooming ratio is selected for the imaging optical system. Further, it is necessary that the magnification $\beta_{2W}$ at the wide position is equal to the magnification $\beta_{2T}$ at the tele position for the reason described below. When the focal lengths at the wide position and the tele position of the imaging optical system are represented by $f_W$ and $f_T$ respectively, these focal lengths are expressed as follows:

$$f_W = f_1 \cdot \beta_{2W} \cdot \beta_{3W} = f_1 \cdot \beta_{3W}/\sqrt{z}$$

$$f_T = f_1 \cdot \beta_{2T} \cdot \beta_{3T} = f_1 \cdot \sqrt{z} \cdot \beta_{3T}$$

Since $z = f_T/f_W = z(\beta_{3T}/\beta_{3W})$, we obtain $\beta_{3W} = \beta_{3T}$.

The distance IO is minimized so as to make the imaging optical system compact by selecting $\beta_3 = 1$ as described above. Therefore, it is preferable that the second lens unit and the third lens unit have magnifications $\beta_2 = 1$ and $\beta_3 = 1$ respectively at an intermediate zoomed position between the wide position and the tele position. In this case, the zooming ratio of the imaging optical system is determined so as to allow the magnification $\beta_2$ of the second lens unit to vary from the wide position to the tele position z times as high. Alternately, it is possible to obtain the zooming ratio z by selecting magnifications of the lens units as described below. That is to say, $\beta_{2W} = 1$ and $\beta_{2T} = \sqrt{z}$ are selected for the second lens unit so as to vary the magnification $\beta_2$ by $\sqrt{z}$ times as high from the wide position to the tele position. When the magnifications of the second lens unit are selected as described above, the total magnification of $\beta_2 \times \beta_3$ of the vari-focal system is enhanced z times as high from the wide position to the tele position, thereby making it possible to obtain an imaging optical system having the zooming ratio of z. Assuming here that $f_W = f_1$, for example, $\beta_3$ has a range from $\beta_{3W} = 1$ to $\beta_{3T} = \sqrt{z}$.

In the case described above, the distance IO varies in the same manner as that in the case where $\beta_2$ has the above-mentioned range from $1/\sqrt{z}$ to $\sqrt{z}$, and the similar applies to the range of $\beta_2$, thereby making it possible to design the imaging optical system compact.

In each of the two examples described above, it is desirable to select $\beta_2 = 1$ and $\beta_3 = 1$.

Next, in order to design the zoom imaging optical system according to the present invention so as to enhance the magnification thereof continuously from the wide position to the tele position, it is necessary to design the optical system so as to satisfy the relationship expressed by the following condition (iii):

$$f_W < f_N < f_T \quad \text{(iii)}$$

wherein the reference symbol $f_N$ represents the focal length of the imaging optical system as a whole in the normal condition thereof and is expressed as $$f_N = \sqrt{z} f_W.$$

The above-mentioned condition (ii) can be transformed as follows:

$$(\beta_{2W} \cdot \beta_{3W})/\sqrt{z} < f_W/f_1 < \sqrt{z} \cdot \beta_{2W} \cdot \beta_{3W}$$

Further, it is desirable to design the first lens unit of the imaging optical system according to the present invention so as to satisfy the following condition (1):

$$0.5 < f_W/f_1 < 2 \quad \text{(1)}$$

If the lower limit of the condition (1) is exceeded, $f_1$ will have a large value, thereby prolonging the moving distance of the first lens unit for focusing, widening the airspaces reserved between the lens units and prolonging the total length of the imaging optical system. In addition, height of ray will be enhanced, thereby enlarging the outside diameter of each of the lens components. If the upper limit of the condition (1) is exceeded, f: will have a smaller value and the magnification of the third lens unit is enhanced, whereby the imaging optical system will have a longer back focal length and cannot be made compact.

In order to make the imaging optical system compact as a whole, it is preferable to select $\beta_2 = \beta_3 = 1$. When each of the second lens unit and the third lens unit has the magnification of 1 in the imaging optical system and its focal length is represented by f, $f_W$ must be not longer than $f_1$ for obtaining $f_W \leq f$. However, since $f_1$ cannot be so long as described above, it is more preferable to select $f_W \approx f_1$, or $f_W/f_1 \approx 1$.

When the focal length f of the imaging optical system as a whole is nearly equal to $f_W$ at the intermediate position in the above-described case where $\beta_2$ varies from $1/\sqrt{z}$ to $\sqrt{z}$, it is possible to select the above-mentioned position as the wide position. In this case, $\beta_2$ is progressively enhanced, whereas $\beta_3$ is progressively lowered, whereby these magnifications are cancelled with each other and the total magnification, i.e., the focal length of the imaging optical system as a whole scarecely varies from the wide position to the intermediate position. Accordingly, the wide position shown in FIG. 23 is not used as the wide position of the imaging optical system, but the position at which the imaging optical system has the intermediate focal length is selected as the wide position as in the case of Embodiment 1 to be described later. That is to say, the lens units are moved as exemplified by Embodiment 3 to be described later, or as illustrated in FIG. 25.

When the variation (lowering) of $\beta_3$ is large relative to the variation (enhancement) of $\beta_2$, these magnifications cannot be cancelled with each other and $f_W$ may be longer than f. In this case also, it is desirable to move the lens units in the imaging optical system as illustrated in FIG. 7.

Furthermore, the stroke which is necessary to move the focusing lens unit for the diopter adjustment is determined dependently on a required range of diopters. When the focal length of the focusing lens unit (the first lens unit) is represented by $f_1$, the moving stroke $d_f$ required for adjusting 1 diopter (1000 mm) is given by the following formula (v):

$$d_f = f_1^2/1000 \quad \text{(v)}$$

Hence, moving stroke $d_f'$ for the first lens unit required for reserving a range of an optional diopter taken as standard $\pm y$ diopters is expressed by the following formula (vi):

$$d_f' = d_f \times y = f_1^2 \cdot y/1000 \quad \text{(vi)}$$

That is to say, it is necessary to reserve at least an airspace of $f^2 \cdot y/1000$ on each side of the focusing lens unit. Especially at the wide position at which the airspace between the first lens unit and the second lens unit is maximum, an airspace not narrower than the value mentioned above must be reserved. When the airspace is too narrow before the focusing lens unit, the eyepiece of an endoscope will strike against the cover glass of the adapter. If the airspace is too narrow after the focusing lens unit, in contrast, the first lens unit will strike against the lens units having the vari-focal function, thereby making it impossible to reserve the required range of diopters. In addition, when the wide airspaces are reserved before and after the first lens unit, the imaging optical system will have a long total length and cannot be made compact.

It is desirable to select, though different dependently on types of endoscopes, $d_f'/d_f$ within the range defined by the following condition (2):

$$0 < d_f'/d_f \leq 20 \, (10/f_W) \quad \text{(2)}$$

wherein $20(10/f_W)$ means that the upper limit of the condition (2) lies at 20 when $f_W$ is normalized to 10.

The condition (2) indicates the range of diopter adjustment required for the imaging optical system. Since endoscopes are set at different diopters, the number of diopters to be adjusted is variable dependently on selection of a diopter to be taken as standard and the range of diopters to be covered for purpose of application.

If the lower limit of the condition (2) is exceeded, or if $d_f'/d_f$ is zero, the imaging optical system will be completely incapable of adjusting diopters and cannot be combined with endoscopes equipped with eyepiece lens system having different dioptric powers. If the upper limit of the condition (2) is exceeded, in contrast, the lens units will be moved for longer distances, thereby making it impossible to design the imaging optical system compact.

Most of optical systems to be arranged in adapters for endoscopes, like the imaging optical system according to the present invention, have focal lengths on the order of 10 mm to 50 mm. When an imaging optical system arranged in an adapter having a zooming ratio of 2, for example, has a focal length varied from 20 mm to 40 mm by zooming, moving distance per diopter changes from 0.4 mm to four-fold, i.e., 1.6 mm for focusing by moving the imaging optical system as a whole. When the diopter adjustment is performed by moving the lens unit arranged before a vari-focal lens system as in the case of the imaging optical system according to the present invention, in contrast, the moving distance of the focusing lens unit remains unchanged regardless of zooming, or a short moving distance of the focusing lens unit is sufficient for the optical system. In this case, focusing lens unit is assumed to have a focal length of 20 mm.

When an adapter using the imaging optical system according to the present invention is combined with a video camera comprising an image pickup device such as CCD having sensitivity to lights within the infrared region, it is necessary to employ an infrared cut filter and optical low pass filters such as a quartz filter for eliminating spurious signals such as moiré. Therefore, it is necessary to reserve spaces for arranging these filters in the zoom imaging optical system. Accordingly, it is desirable to design the imaging optical system so as to satisfy the following condition (3):

$$1 < f_B/f_3 < 3 \quad \text{(3)}$$

wherein the reference symbol $f_B$ represents the back focal length of the imaging optical system and the reference symbol $f_3$ designates the focal length of the third lens unit.

The condition (3) defines the range of variation of back focal length of the imaging optical system which is to be caused by moving the third lens unit. The back focal length by definition is the distance as measured from the third lens unit to the image surface, and when a cover glass, filters, etc. are arranged, these members are to be removed for determining the back focal length.

If the lower limit of the condition (3) is exceeded, the back focal length will be too short to reserve the spaces required for arranging filters. If the upper limit of the condition (3) is exceeded, sufficient spaces for arranging the filters can be reserved, but the back focal length will be too long, thereby undesirably prolonging the total length of the imaging optical system.

When an attempt is made to design a compact optical system like the imaging optical system according to the present invention, each lens unit has a short focal length, thereby allowing aberrations to be easily produced and to be remarkably aggravated by zooming or focusing. It is therefore necessary to prevent aberrations from being remarkably aggravated by zooming or focusing.

It is generally difficult in a zoom lens system to correct chromatic aberration with good balance especially at each position in a vari-focal range. As a means for correcting the chromatic aberration, there is known the method to divide the zoom lens system into lens components and distribute powers among the lens components. Speaking more concretely, it is possible to suppress amount of the chromatic aberration to be produced in each lens unit and prevent the chromatic aberration from being aggravated by zooming or correct the chromatic aberration with good balance at each zoomed position by designing each lens unit so as to comprise a positive lens component and a negative lens component.

Further, it is possible to prevent the third lens unit from striking against the second lens unit by composing the third lens unit of a positive lens component and a negative lens component so as to locate the principal point thereof forward. This composition of the third lens unit also serves for shortening the back focal length of the imaging optical system relative to the focal length thereof.

Furthermore, each of the lens unit has a short focal length in the imaging optical system according to the present invention since it is composed of three lens units, i.e., the positive lens unit, the negative lens unit and the positive lens unit, and designed so as to have a short total length. Especially due to the fact that only the second lens unit is designed as the negative lens unit, the imaging optical system according to the present invention has a short total length and produces remarkable positive spherical aberration. Therefore, the second lens unit is designed as a cemented doublet for correcting the spherical aberration and suppressing the amount of the chromatic aberration to be produced.

Moreover, unless the second lens unit which has the short focal length and is designed as the cemented doublet having a relatively high refractive index, it will have a short radius of curvature on the cemented surface thereof and cannot have so large an outside diameter, thereby vignetting the rays passing through the cemented surface. For this reason, it is desirable that the cemented doublet has a high refractive index or satisfies the following condition (4):

$$|\Delta n| \geq 0.15 \quad (4)$$

wherein the reference symbol $\Delta n$ represents the difference in refractive index between the positive lens element and the negative lens element of the cemented doublet adopted as the second lens unit.

If the lower limit of the condition (4) is exceeded, the cemented surface will have a s radius of curvature and a small outside diameter, thereby vignetting rays. Further, coma and astigmatism will undesirably be produced.

In addition, it is desirable for favorably correcting longitudinal chromatic aberration and lateral chromatic aberration to design the above-mentioned cemented doublet so as to satisfy the following condition (5):

wherein the reference symbol $\Delta \nu$ represents the difference between the Abbe's numbers of the negative lens element and the positive lens element of the above-mentioned cemented doublet.

If $\Delta \nu$ has a value smaller than 14, the second lens unit will not sufficiently effective for correction of the chromatic aberration, thereby making it impossible to correct the chromatic aberration sufficiently in the imaging optical system as a whole.

The foregoing description has been made on the imaging optical system to be combined with endoscopes equipped with the eyepiece lens system illustrated in FIG. 1.

When the imaging optical system according to the present invention is to be combined with endoscopes equipped with no eyepiece lens system as shown in FIG. 2, however, the imaging optical system is composed as described below. That is to say, the first lens unit is divided into a front subunit and a rear subunit so that the front subunit is usable in place of the eyepiece lens system and the rear subunit is moved for focusing. When the first lens unit is composed as described above, it is possible to handle the rear subunit and the lens units arranged later in the same manner as the imaging optical system already described above.

DETAILED DESCRIPTION OF THE PREFERRED EMBODIMENTS

Figure 1:
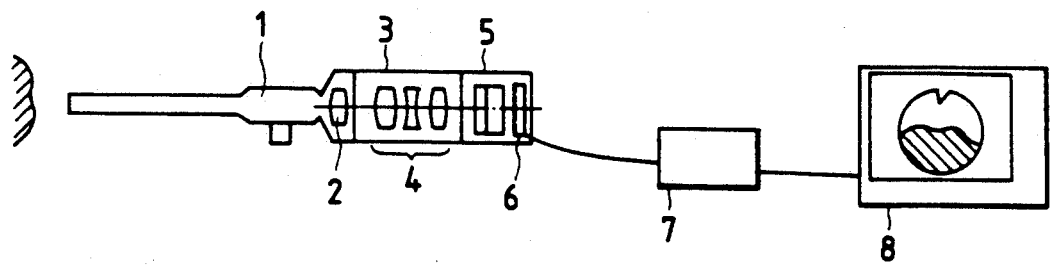
FIG. 1 and FIG. 2 show diagrams illustrating endoscopes connected to TV cameras.
Figure 2:
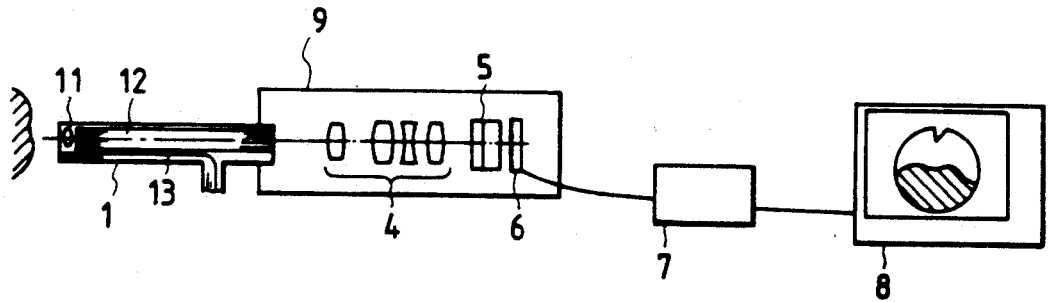
Figure 3:
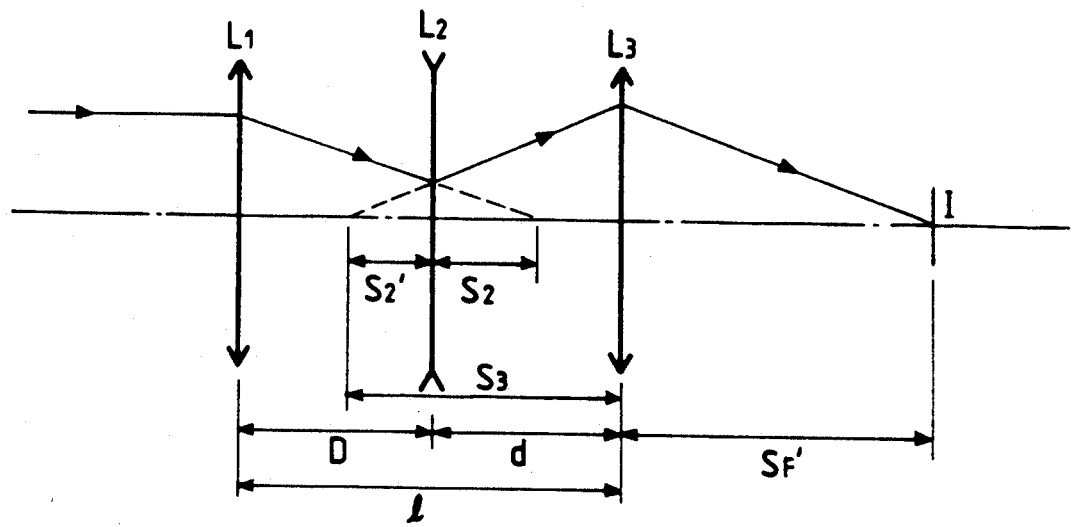
FIG. 3 shows a diagram illustrating the fundamental composition of the imaging optical system according to the present invention.
Figure 4:
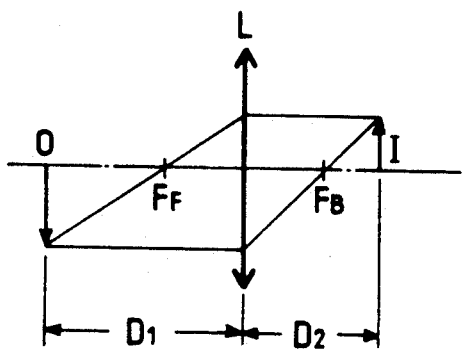
FIG. 4 shows a diagram illustrating the relationship of imaging by an optical system.
Figure 5:
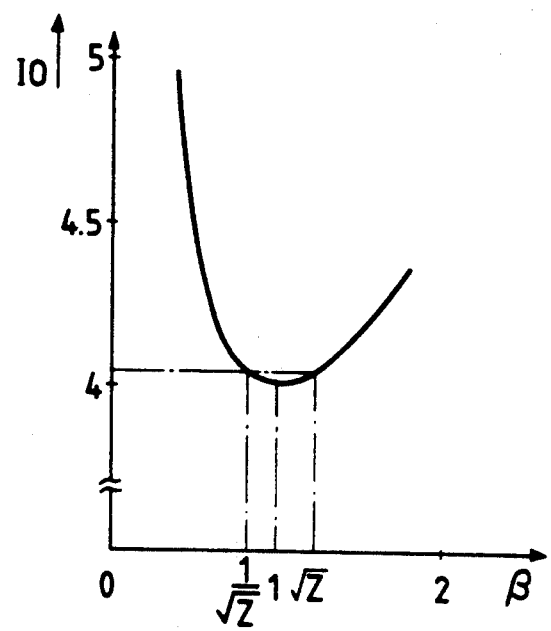
FIG. 5 shows a graph illustrating relationship of a distance between an object and an image versus magnification.

Now, the imaging optical system according to the present invention will be described more detailedly below with reference to the preferred embodiments illustrated in the accompanying drawings and given in the form of the following numerical data:

Embodiment 1

$f_W = 10$, $f_T = 19.055$, F/4.913
$IH = 0.945$, object distance $-443.5377$ $r_1 = \infty$
$\quad d_1 = 0.4435 \quad n_1 = 1.51633 \quad \nu_1 = 64.15$
$r_2 = \infty$
$\quad d_2 = 1.3306$
$r_3 = 6.6339$
$\quad d_3 = 0.5766 \quad n_2 = 1.72000 \quad \nu_2 = 50.25$
$r_4 = -6.6339$
$\quad d_4 = 0.4435 \quad n_3 = 1.80518 \quad \nu_3 = 25.43$
$r_5 = \infty$
$\quad d_5 = D_1$ (variable)
$r_6 = -3.7801$
$\quad d_6 = 0.6533 \quad n_4 = 1.85026 \quad \nu_4 = 32.28$
$r_7 = -1.7534$
$\quad d_7 = 0.3548 \quad n_5 = 1.69680 \quad \nu_5 = 56.49$
$r_8 = 5.0275$
$\quad d_8 = D_2$ (variable)
$r_9 = 12.6349$
$\quad d_9 = 1.1495 \quad n_6 = 1.61765 \quad \nu_6 = 55.05$
$r_{10} = -5.3982$
$\quad d_{10} = 0.0887$
$r_{11} = 4.4471$
$\quad d_{11} = 2.2177 \quad n_7 = 1.51633 \quad \nu_7 = 64.15$
$r_{12} = -4.4471$
$\quad d_{12} = 0.3548 \quad n_8 = 1.85026 \quad \nu_8 = 32.28$
$r_{13} = 14.4769$
$\quad d_{13} = D_3$ (variable)
$r_{14} = \infty$
$\quad d_{14} = 0.4435 \quad n_9 = 1.51633 \quad \nu_9 = 64.15$
$r_{15} = \infty$

| f | 10 | 19.055 |
|---|---|---|
| $D_1$ | 1.356 | 3.847 |
| $D_2$ | 2.979 | 0.488 |
| $D_3$ | 3.024 | 3.024 |

$f_W/f_1 = 0.962$, $d_f/d_f = 19.12$
$f_B/f_3 = 1.849, 1.529$
$\Delta n = 0.15346$, $\Delta\nu = 24.21$

Embodiment 2

$f_W = 10$, $f_T = 19.048$, F/4.913
$IH = 0.943$, object distance $-443.1642$ $r_1 = \infty$
$\quad d_1 = 0.4432 \quad n_1 = 1.51633 \quad \nu_1 = 64.15$
$r_2 = \infty$
$\quad d_2 = 1.3029$
$r_3 = 5.4621$
$\quad d_3 = 0.6869 \quad n_2 = 1.56384 \quad \nu_2 = 60.69$
$r_4 = -5.4621$
$\quad d_4 = 0.3545 \quad n_3 = 1.60342 \quad \nu_3 = 38.01$
$r_5 = \infty$
$\quad d_5 = D_1$ (variable)
$r_6 = -2.9850$
$\quad d_6 = 0.6515 \quad n_4 = 1.88300 \quad \nu_4 = 40.78$
$r_7 = -1.7639$
$r_8 = 4.8242$
$\quad d_7 = 0.3545 \quad n_5 = 1.63854 \quad \nu_5 = 55.38$
$\quad d_8 = D_2$ (variable)
$r_9 = \infty$
$\quad d_9 = 1.1522 \quad n_6 = 1.62299 \quad \nu_6 = 58.14$
$r_{10} = -6.0277$
$\quad d_{10} = 0.6204$
$r_{11} = 4.1898$
$\quad d_{11} = 2.1715 \quad n_7 = 1.51633 \quad \nu_7 = 64.15$
$r_{12} = -9.2016$
$\quad d_{12} = 1.1984$
$r_{13} = -4.1943$
$\quad d_{13} = 0.4432 \quad n_8 = 1.84666 \quad \nu_8 = 23.78$
$r_{14} = -18.0779$
$\quad d_{14} = D_3$ (variable)
$r_{15} = \infty$
$\quad d_{15} = 0.4432 \quad n_9 = 1.51633 \quad \nu_9 = 64.15$
$r_{16} = \infty$

| f | 10 | 19.048 |
|---|---|---|
| $D_1$ | 1.615 | 4.028 |
| $D_2$ | 2.901 | 0.487 |
| $D_3$ | 1.653 | 1.653 |

$f_W/f_1 = 0.963$, $d_f/d_f = 12.06$
$f_B/f_3 = 1.611, 1.317$
$\Delta n = 0.24446$, $\Delta\nu = 14.6$

Embodiment 3

$f_W = 10$, $f_T = 18.914$, F/4.913
$IH = 0.938$, object distance $-442.5562$ $r_1 = \infty$
$\quad d_1 = 0.4426 \quad n_1 = 1.51633 \quad \nu_1 = 64.15$
$r_2 = \infty$
$\quad d_2 = 1.3719$
$r_3 = 6.2080$
$\quad d_3 = 0.5930 \quad n_2 = 1.72000 \quad \nu_2 = 50.25$
$r_4 = -6.2080$
$\quad d_4 = 0.3540 \quad n_3 = 1.80518 \quad \nu_3 = 25.43$
$r_5 = 276.9352$
$\quad d_5 = D_1$ (variable)
$r_6 = -4.4263$
$\quad d_6 = 0.6519 \quad n_4 = 1.85026 \quad \nu_4 = 32.28$
$r_7 = -1.8721$
$\quad d_7 = 0.3540 \quad n_5 = 1.69680 \quad \nu_5 = 56.49$
$r_8 = 4.4745$
$\quad d_8 = D_2$ (variable)
$r_9 = 8.0397$
$\quad d_9 = 1.2082 \quad n_6 = 1.61765 \quad \nu_6 = 55.05$
$r_{10} = -6.2215$
$\quad d_{10} = 0.0885$
$r_{11} = 4.0919$
$\quad d_{11} = 2.1154 \quad n_7 = 1.51633 \quad \nu_7 = 64.15$
$r_{12} = -4.0919$
$\quad d_{12} = 0.3540 \quad n_8 = 1.85026 \quad \nu_8 = 32.28$
$r_{13} = 8.8045$
$\quad d_{13} = D_3$ (variable)
$r_{14} = \infty$
$\quad d_{14} = 0.4426 \quad n_9 = 1.51633 \quad \nu_9 = 64.15$
$r_{15} = \infty$

| f | 10 | 18.914 |
|---|---|---|
| $D_1$ | 2.118 | 3.232 |
| $D_2$ | 3.530 | 0.487 |
| $D_3$ | 0.847 | 2.776 |

$f_W/f_1 = 1.001$, $d_f/d_f = 11.15$
$f_B/f_3 = 1.844, 1.462$
$\Delta n = 0.15346$, $\Delta\nu = 24.21$

Embodiment 4

$f_W = 10$, $f_T = 18.905$, F/6.444
$IH = 1.236$, object distance $-7.0772$ $r_1 = 9.3736$ -continued

| | | | |
|---|---|---|---|
| $r_2 = 3.6115$ | $d_1 = 0.3976$ | $n_1 = 1.78472$ | $\nu_1 = 25.71$ |
| $r_3 = -8.3036$ | $d_2 = 1.1486$ | $n_2 = 1.66672$ | $\nu_2 = 48.32$ |
| $r_4 = 6.0567$ | $d_3 = 3.5165$ | | |
| $r_5 = -6.0567$ | $d_4 = 0.6052$ | $n_3 = 1.72000$ | $\nu_3 = 50.25$ |
| $r_6 = \infty$ | $d_5 = 0.4418$ | $n_4 = 1.78472$ | $\nu_4 = 25.71$ |
| $r_7 = -3.0094$ | $d_6 = D_1$ (variable) | | |
| $r_8 = -1.6368$ | $d_7 = 0.6627$ | $n_5 = 1.84666$ | $\nu_5 = 23.78$ |
| $r_9 = 3.8518$ | $d_8 = 0.3534$ | $n_6 = 1.62374$ | $\nu_6 = 47.10$ |
| $r_{10} = 8.3623$ | $d_9 = D_2$ (variable) | | |
| $r_{11} = -5.9383$ | $d_{10} = 1.2193$ | $n_7 = 1.62041$ | $\nu_7 = 60.06$ |
| $r_{12} = 4.0630$ | $d_{11} = 0.0884$ | | |
| $r_{13} = -4.0630$ | $d_{12} = 2.0808$ | $n_8 = 1.51633$ | $\nu_8 = 64.15$ |
| $r_{14} = 10.1966$ | $d_{13} = 0.3534$ | $n_9 = 1.85026$ | $\nu_9 = 32.28$ |
| $r_{15} = \infty$ | $d_{14} = D_3$ (variable) | | |
| $r_{16} = \infty$ | $d_{15} = 0.4418$ | $n_{10} = 1.51633$ | $\nu_{10} = 64.15$ |

| f | 10 | 18.905 |
|---|---|---|
| $D_1$ | 2.268 | 3.403 |
| $D_2$ | 3.325 | 0.553 |
| $D_3$ | 0.959 | 2.597 |

$f_W/f_1 = 1.086$, $d_f/d_f = 11.996$
$f_B/f_3 = 1.585, 1.924$
$|\Delta n| = 0.22292$, $|\Delta \nu| = 23.32$ Embodiment 5

$f_W = 10$, $f_T = 18.905$, F/8.873
IH = 0.39, object distance −0.8261

| | | | |
|---|---|---|---|
| $r_1 = -26.8153$ | $d_1 = 0.4418$ | $n_1 = 1.51823$ | $\nu_1 = 58.96$ |
| $r_2 = -1.4579$ | $d_2 = 0.1369$ | | |
| $r_3 = 2.5190$ | $d_3 = 0.4860$ | $n_2 = 1.62230$ | $\nu_2 = 53.20$ |
| $r_4 = -2.5190$ | $d_4 = 0.2430$ | | |
| $r_5 = -3.1901$ | $d_5 = 0.3932$ | $n_3 = 1.74000$ | $\nu_3 = 28.29$ |
| $r_6 = 1.0620$ | $d_6 = 0.8040$ | $n_4 = 1.53256$ | $\nu_4 = 45.91$ |
| $r_7 = -4.2432$ | $d_7 = 1.0470$ | | |
| $r_8 = -8.2833$ | $d_8 = 0.6538$ | $n_5 = 1.53256$ | $\nu_5 = 45.91$ |
| $r_9 = -2.4748$ | $d_9 = 2.0984$ | | |
| $r_{10} = 6.0567$ | $d_{10} = 0.6052$ | $n_6 = 1.72000$ | $\nu_6 = 50.25$ |
| $r_{11} = -6.0567$ | $d_{11} = 0.4418$ | $n_7 = 1.78472$ | $\nu_7 = 25.71$ |
| $r_{12} = \infty$ | $d_{12} = D_1$ (variable) | | |
| $r_{13} = -3.0094$ | $d_{13} = 0.6627$ | $n_8 = 1.84666$ | $\nu_8 = 23.78$ |
| $r_{14} = -1.6368$ | $d_{14} = 0.3534$ | $n_9 = 1.62374$ | $\nu_9 = 47.10$ |
| $r_{15} = 3.8518$ | $d_{15} = D_2$ (variable) | | |
| $r_{16} = 8.3623$ | $d_{16} = 1.2193$ | $n_{10} = 1.62041$ | $\nu_{10} = 60.06$ |
| $r_{17} = -5.9383$ | $d_{17} = 0.0884$ | | |
| $r_{18} = 4.0630$ | | | |

-continued

| | | | |
|---|---|---|---|
| $r_{19} = -4.0630$ | $d_{18} = 2.0808$ | $n_{11} = 1.51633$ | $\nu_{11} = 64.15$ |
| $r_{20} = 10.1966$ | $d_{19} = 0.3534$ | $n_{12} = 1.85026$ | $\nu_{12} = 32.28$ |
| $r_{21} = \infty$ | $d_{20} = D_3$ (variable) | | |
| $r_{22} = \infty$ | $d_{21} = 0.4418$ | $n_{13} = 1.51633$ | $\nu_{13} = 64.15$ |

| f | 10 | 18.905 |
|---|---|---|
| $D_1$ | 2.268 | 3.403 |
| $D_2$ | 3.325 | 0.553 |
| $D_3$ | 0.959 | 2.597 |

$f_W/f_1 = 1.086$, $d_f/d_f = 11.996$
$f_B/f_3 = 1.585, 1.924$
$|\Delta n| = 0.22292$, $|\Delta \nu| = 23.32$ wherein the reference symbols $r_1, r_2, \ldots$ represent the radii of curvature on the surface of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

Figure 6:
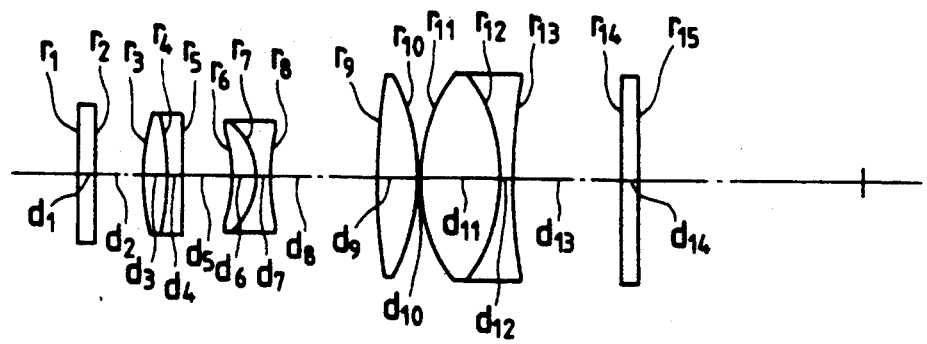
FIG. 6 through FIG. 10 show sectional views illustrating compositions of Embodiments 1 through 5 of the imaging optical system according to the present invention.
Figure 7:
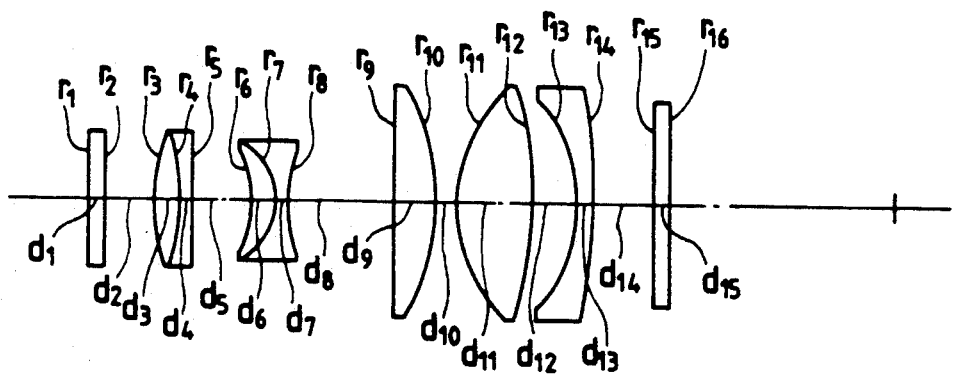
Figure 8:
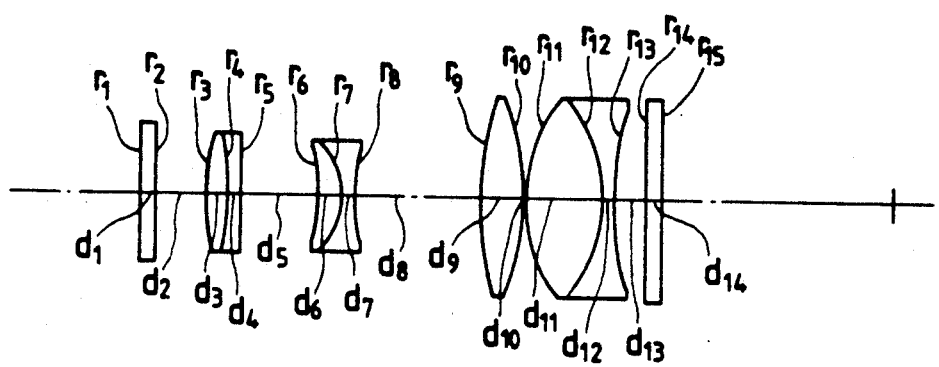

The Embodiments 1 through 3 have the compositions illustrated in FIG. 6 through FIG. 8 respectively and comprise waterproof and chemical resistant cover glass plates (plane parallel plates) arranged before and after the optical systems.

In the Embodiment 6, each of the first lens unit and the second lens unit is designed as a cemented doublet, and the third lens unit comprises a lens component designed as a cemented doublet. These cemented doublets serve for favorably correcting the longitudinal chromatic aberration and the lateral chromatic aberration which are apt to be varied remarkably by focusing and zooming. Further, the use of these cemented doublets facilitates the imaging optical system.

In the Embodiment 2, the first lens unit and the second lens unit are designed as cemented doublets respectively as in the Embodiment 1, whereas the third lens unit is composed of lens elements separated from one another. Speaking more concretely, the third lens unit is composed of a positive lens element, a positive lens element and a negative lens element for correcting the chromatic aberration favorably.

Figure 23:
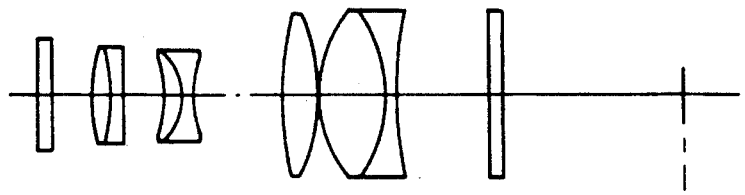
FIG. 23 shows sectional views illustrating zoomed positions of the Embodiment of the present invention.
Figure 23:
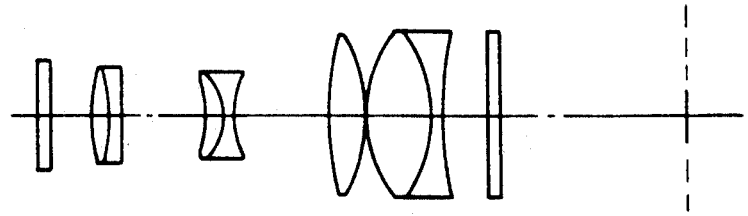
Figure 23:
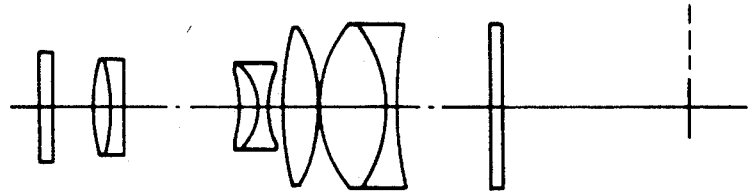
Figure 24:
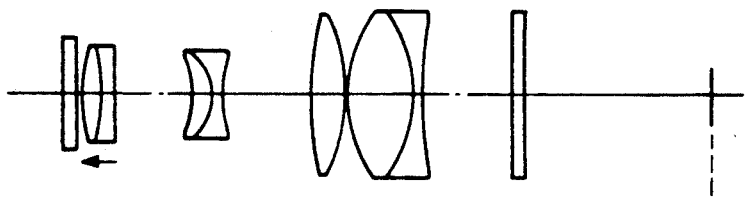
FIG. 24 shows sectional views illustrating focused positions of the Embodiment 1 of the present invention.
Figure 24:
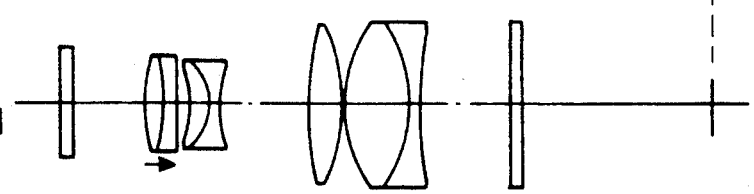

FIG. 23 shows zoomed positions of the Embodiment 1. Further, FIG. 24 illustrates the movement of the focusing lens unit at the wide position of the Embodiment 1 for setting the imaging optical system at approximately −11.3 diopters and approximately +6.8 diopters.

Figure 25:
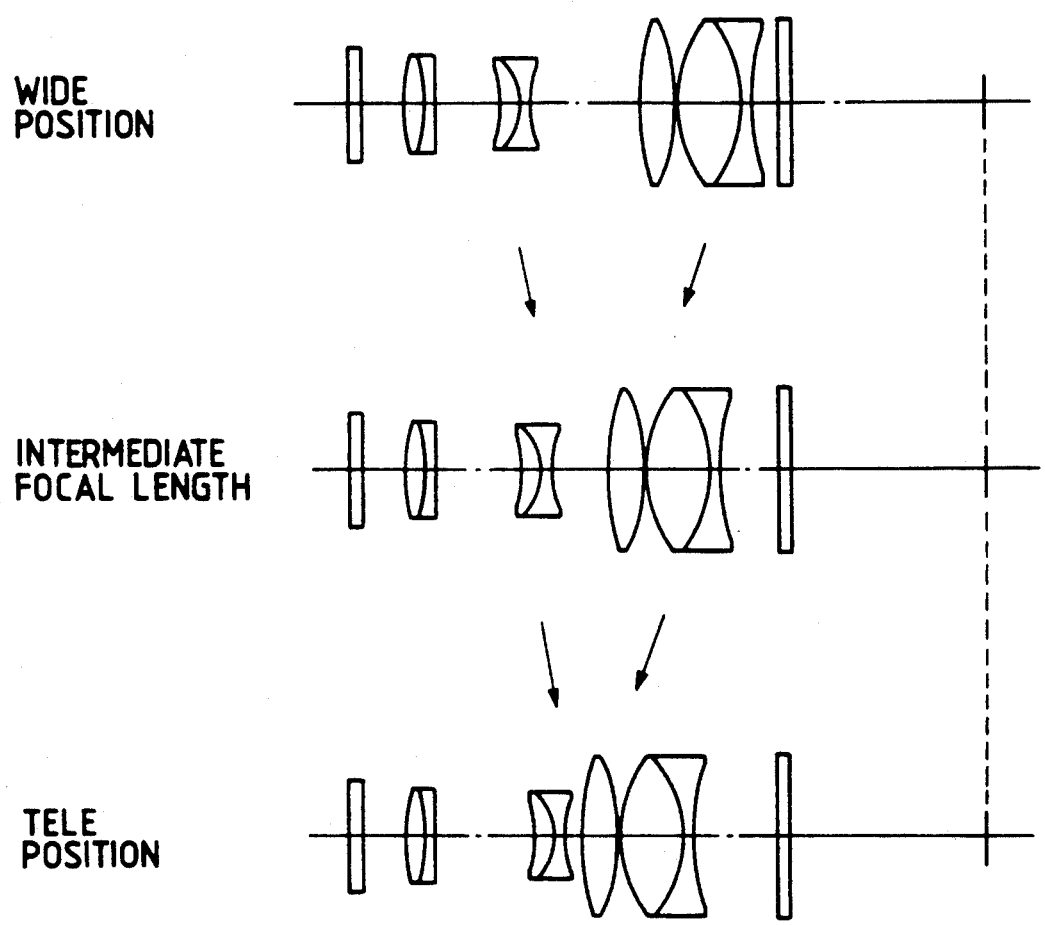
FIG. 25 shows sectional views illustrating zoomed positions of the Embodiment 3 of the present invention.

The Embodiment 3 has a composition which is similar to that of the Embodiment 1 and is designed so as to move the lens units for zooming as illustrated in FIG. 25.

Figure 9:
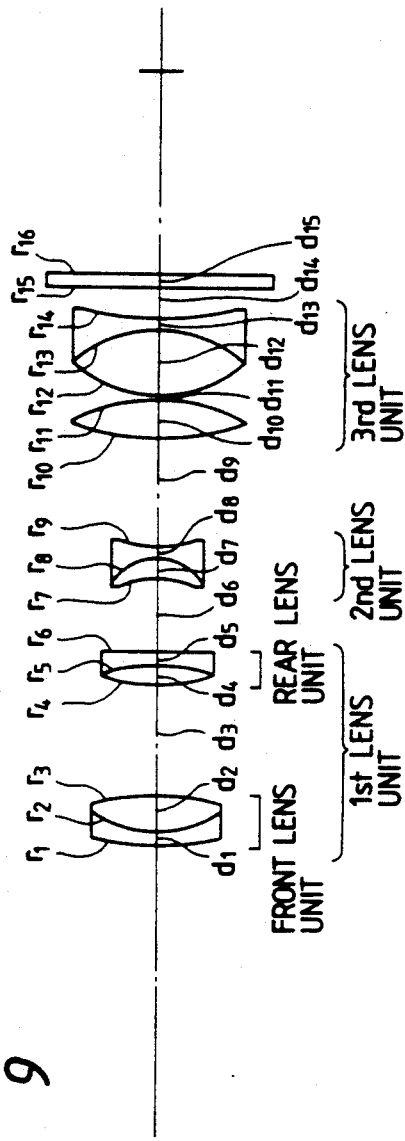
Figure 10:
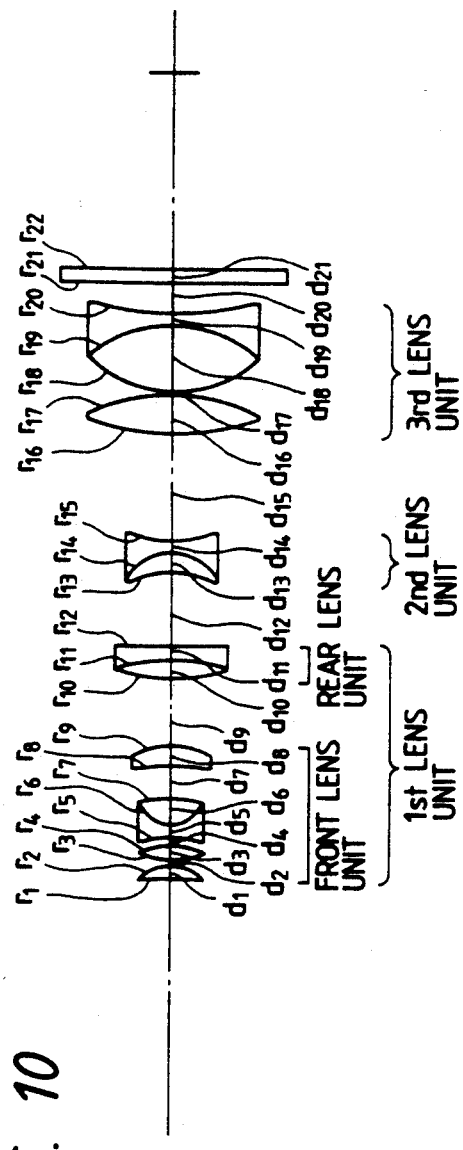
Figure 11:
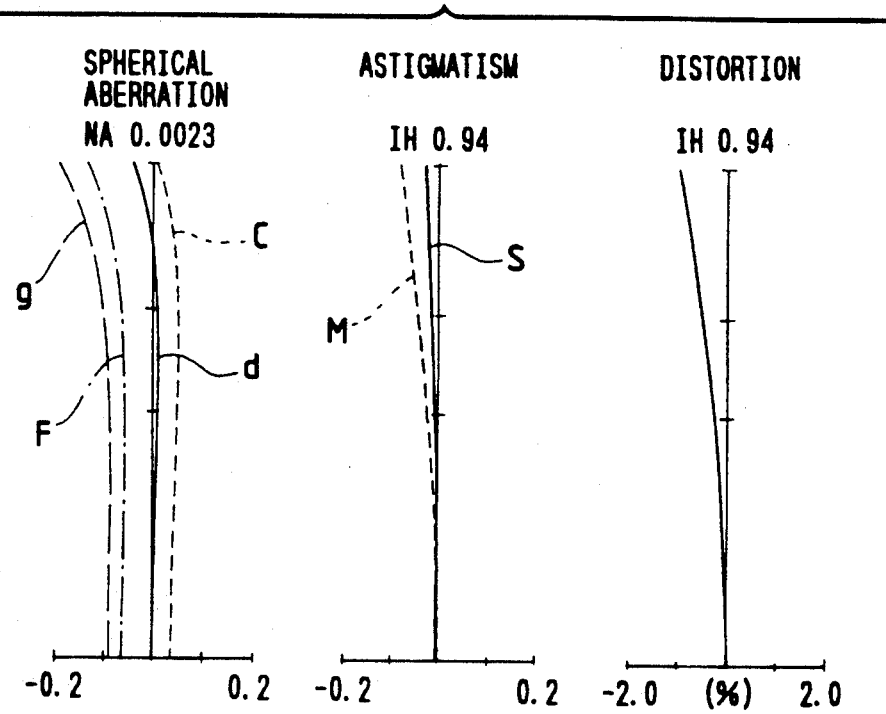
FIG. 11 and FIG. 12 show graphs illustrating aberration characteristics at the wide position and tele position of the Embodiment 1 of the present invention.
Figure 12:
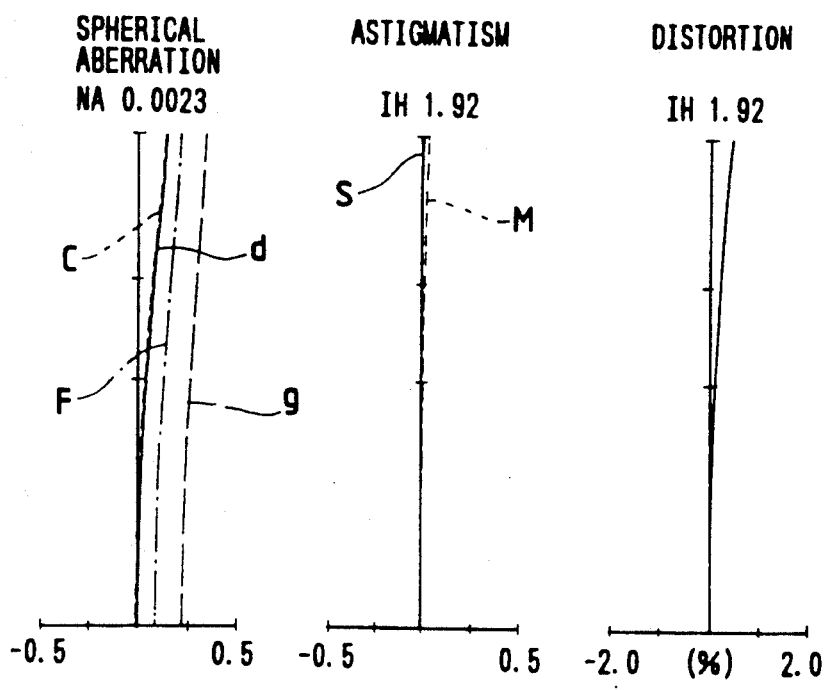
Figure 13:
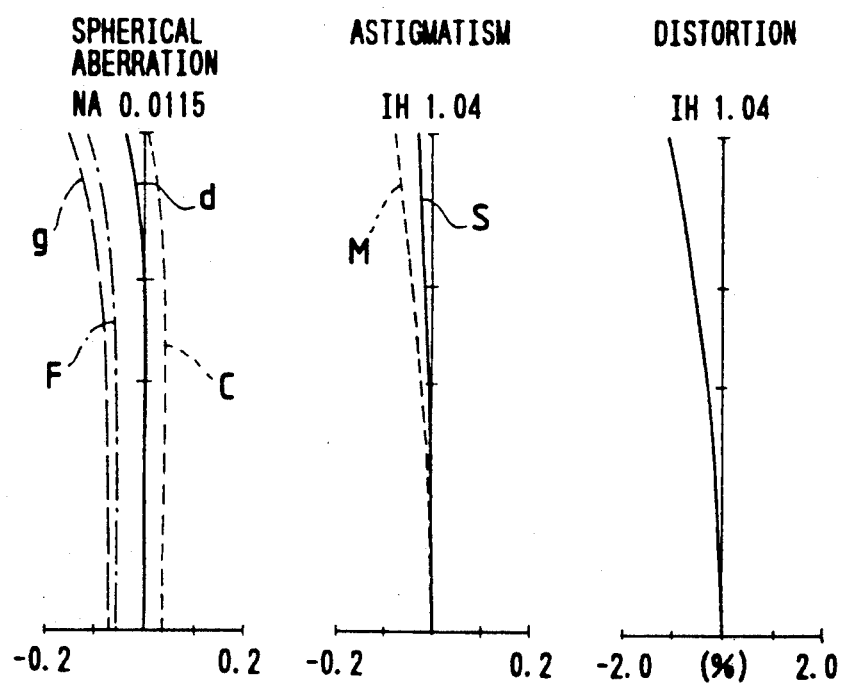
FIG. 13 and FIG. 14 show graphs illustrating aberration characteristics at $-11.3$ diopters and $+6.8$ diopters at the wide position of the Embodiment 1 of the present invention.
Figure 14:
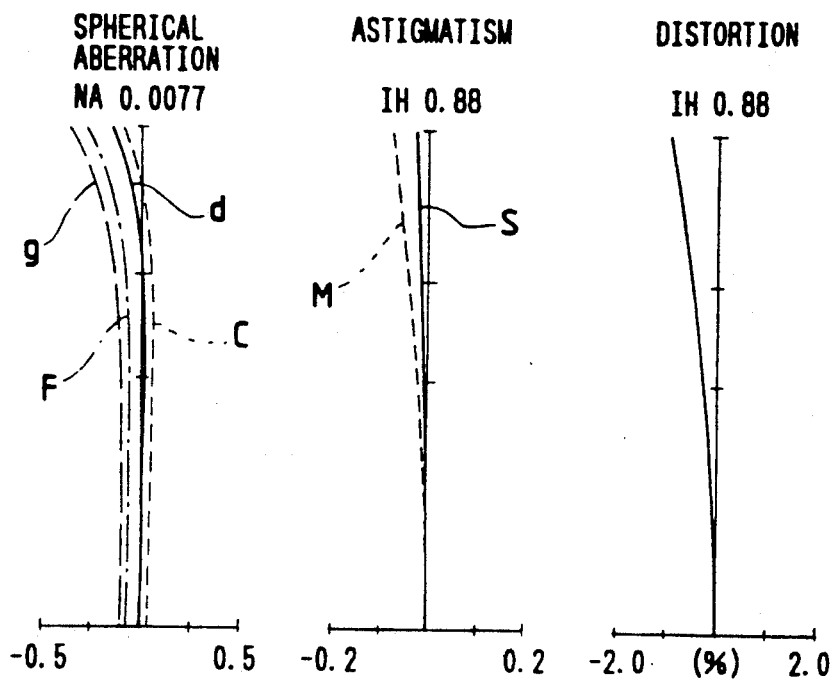
Figure 15:
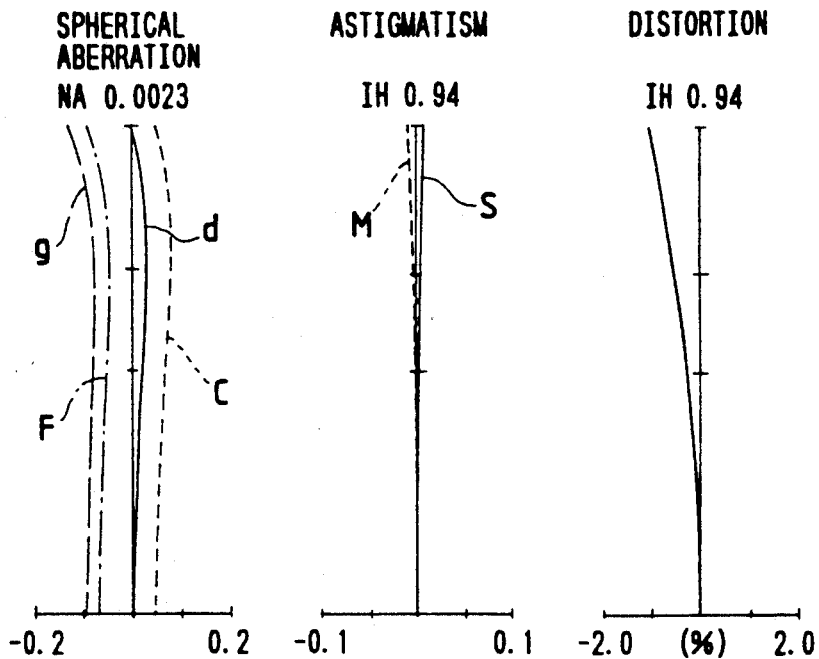
FIG. 15 and FIG. 16 show curves illustrating aberration characteristics at the wide position and tele position of the Embodiment 2 of the present invention.
Figure 16:
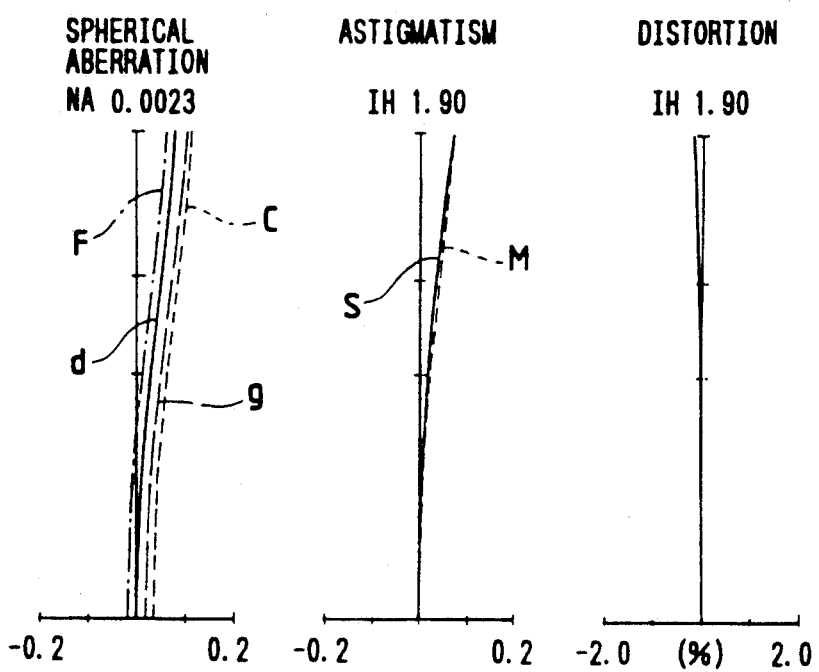
Figure 17:
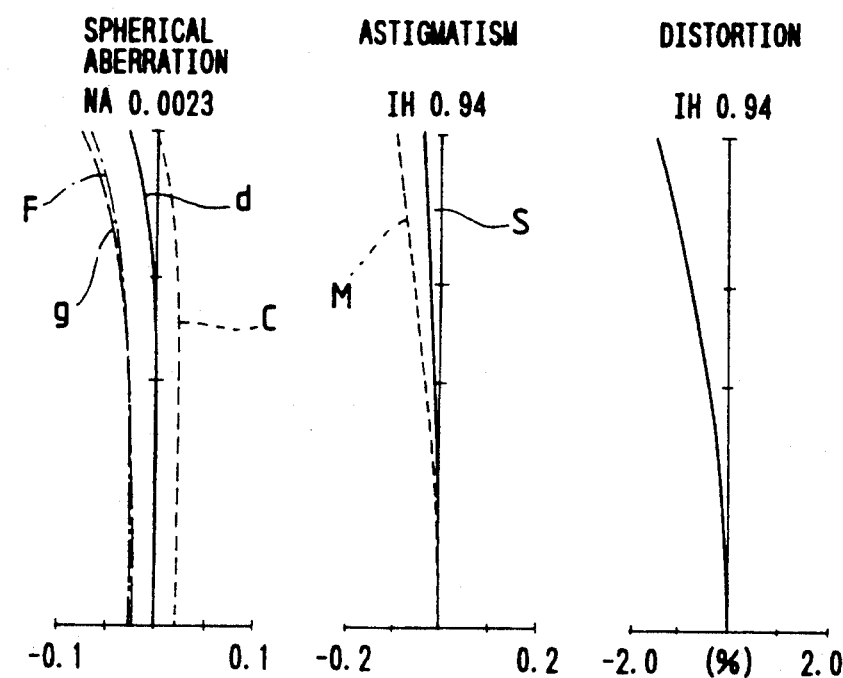
FIG. 17 and FIG. 18 show curves illustrating aberration characteristics at the wide position and tele position of the Embodiment 3 of the present invention.
Figure 18:
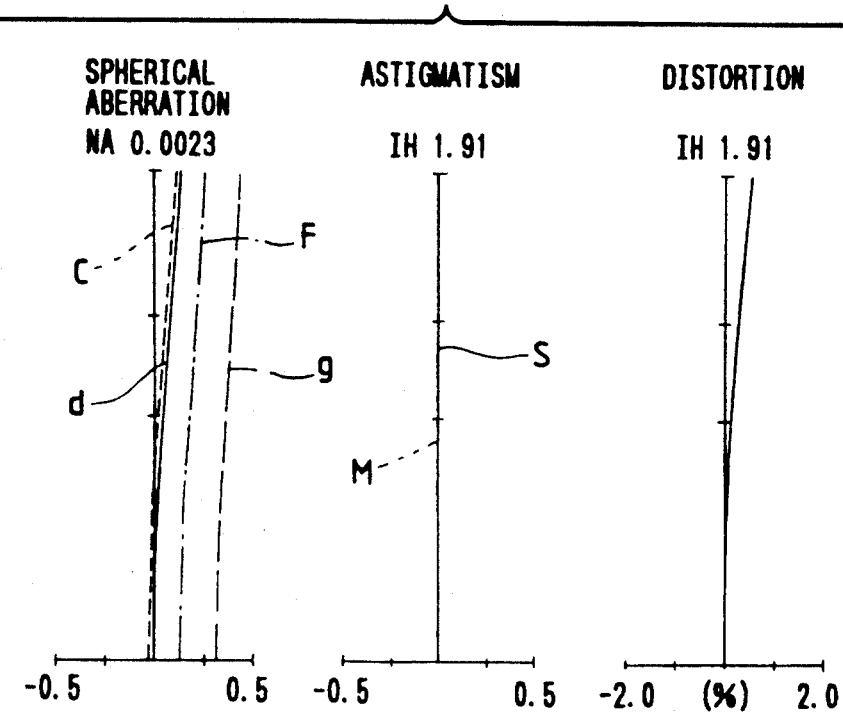
Figure 19:
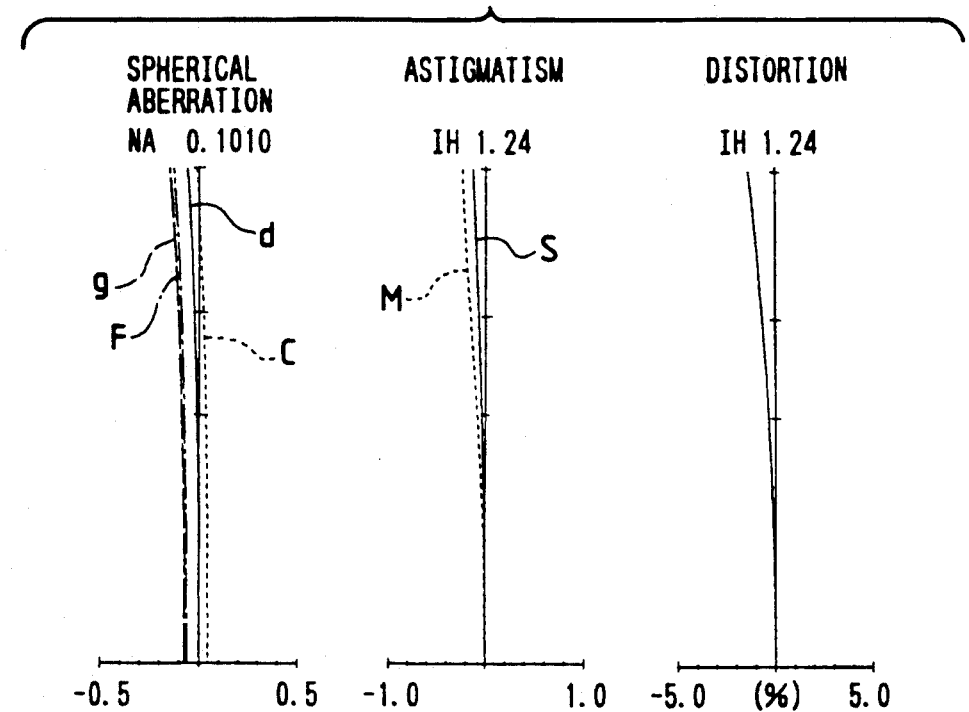
FIG. 19 and FIG. 20 show graphs visualizing aberration characteristics at the wide position and tele position of the Embodiment 4 of the present invention.
Figure 20:
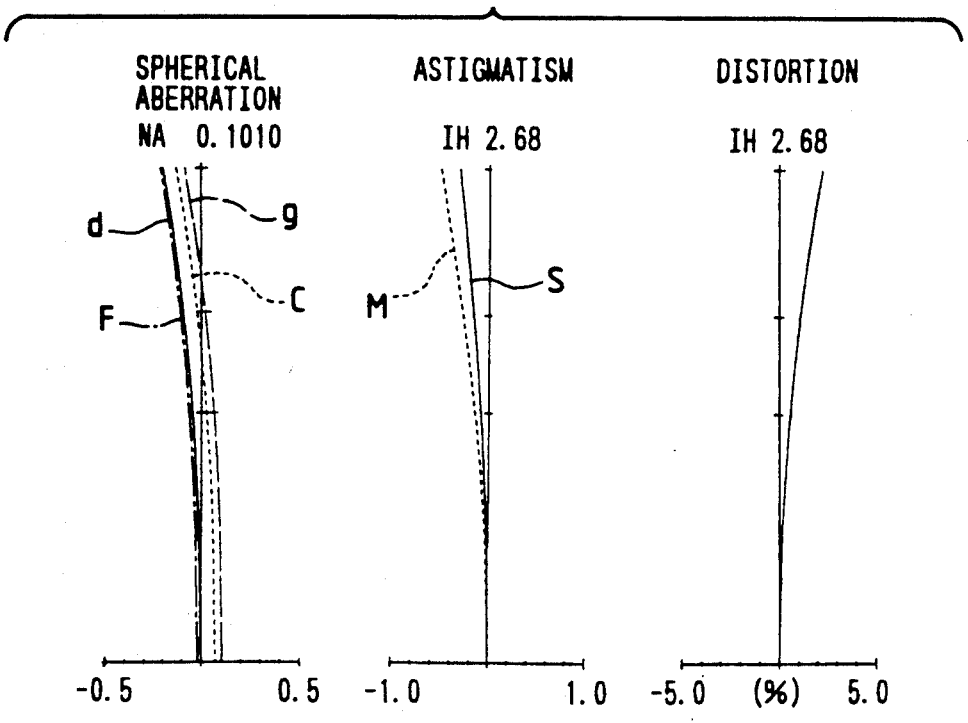
Figure 21:
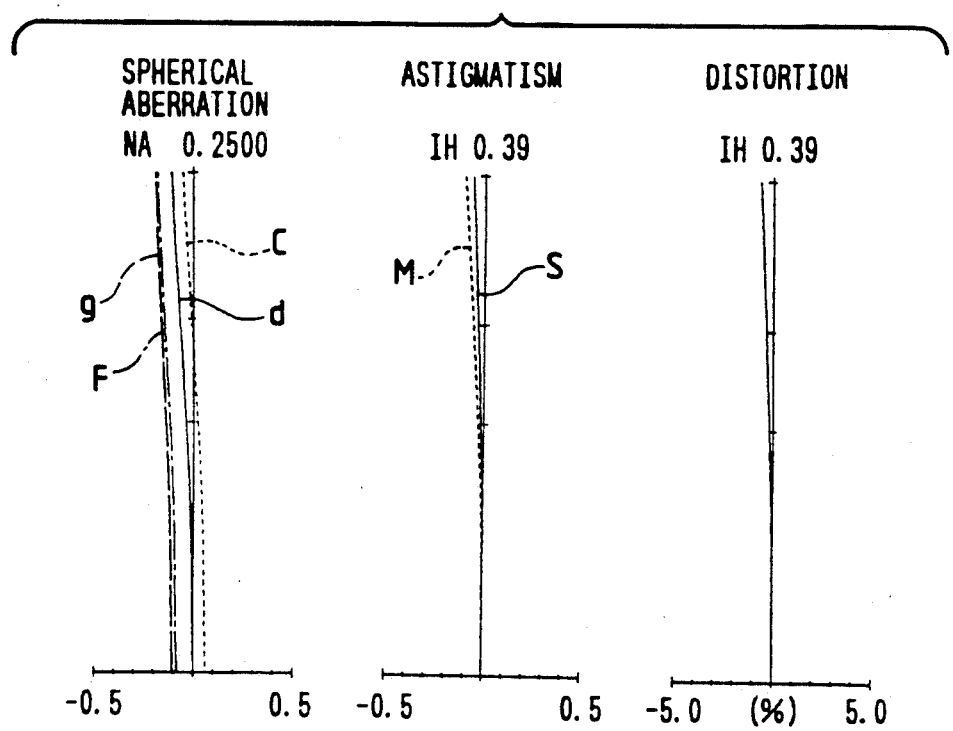
FIG. 21 and FIG. 22 show graphs visualizing aberration characteristics at the wide position and tele position of the Embodiment 5 of the present invention.
Figure 22:
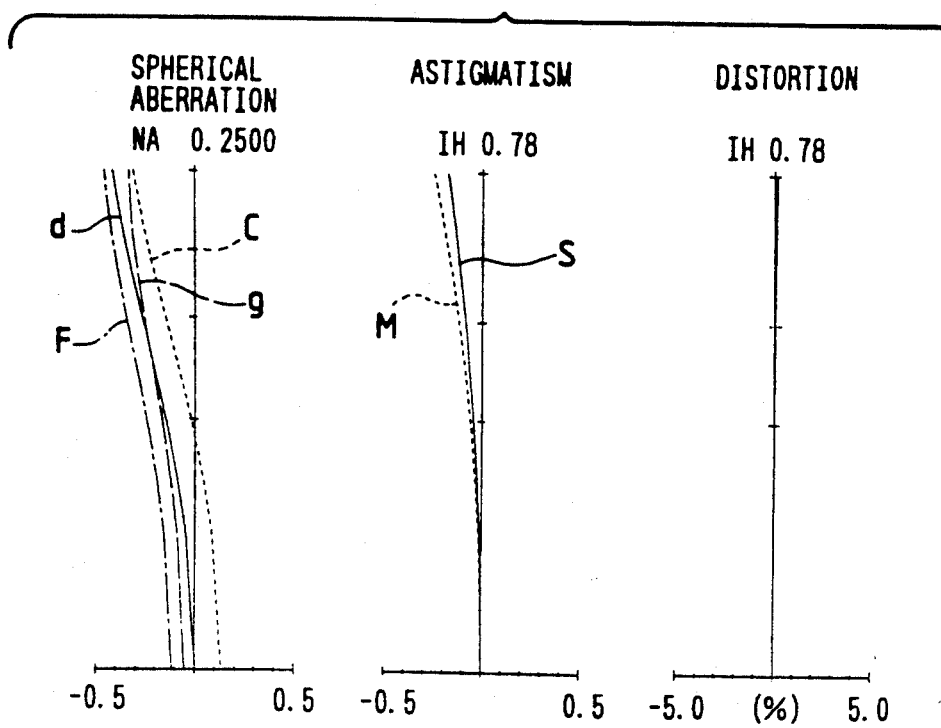

The Embodiments 4 and 5 have the compositions illustrated in FIG. 9 and FIG. 10 respectively wherein the first lens unit is composed of two subunits having positive refractive powers (a front subunit and a rear subunit) Each of the Embodiments 4 and 5 is the same as the Embodiment 3, except for said front subunit which is arranged in the Embodiment 4 or 5.

The Embodiment 4 uses the front subunit which is composed only of a single cemented doublet, whereas the Embodiment 5 adopts the front subunit which is composed of a plurality of lens components and has a magnification higher than that of the front subunit used in the Embodiment 4.

The Embodiments 4 and 5 are designed for combination with endoscopes which are not equipped with eyepiece lens systems, and to be used for observing images formed by super thin fiber scopes which are employed especially for blood vessels.

By using the imaging optical system according to the present invention as a zoom adapter, it is possible, even when the optical system is combined with TV cameras incorporating image pickup devices having different sizes, to observe images projected at desired sizes on a monitor while changing magnification of the optical system in accordance with the sizes of the image pickup devices. Therefore, the imaging optical system according to the present invention can be used in combination with various types of TV cameras equipped with image pickup devices having different sizes. Further, it is possible to compose image pickup systems by integrating the imaging optical system according to the present invention with solid-state image pickup devices.

Furthermore, when the imaging optical system according to the present invention is combined with endoscopes, the optical system permits optionally adjusting sizes of images formed by the endoscopes as desired, and controlling dioptric power by moving the focusing lens unit for a definite distance regardless of variation of dioptric power of the endoscopes and zoomed position of the optical system. Moreover, the imaging optical system according to the present invention has a simple composition, a compact external design, light weight and high optical performance.

When the imaging optical system has the composition exemplified by the Embodiment 4 or 5, the optical system is compatible with endoscopes which are not equipped with eyepiece lens systems.

I claim:

1. An imaging optical system for endoscopes, disposed after an eyepiece lens system for re-imaging an image formed by an endoscope equipped with an objective lens system, an image transmitting optical system for transmitting an image formed by the objective lens system to a predetermined location and said eyepiece lens system, said imaging optical system comprising, in order from the object side:

a first positive lens unit having a focusing function, a second negative lens unit having a negative refractive power and moved in a definite direction along the optical axis so as to progressively enhance magnification of the imaging optical system when a focal length of the imaging optical system is varied from the wide position to the tele position, and a third lens unit having a positive refractive power and moved along the optical axis so as to keep the image point constant regardless of variation of focal length, wherein said first lens unit is movable independently of the other lens units so as to allow focusing even when dioptric power varies within a positive-to-negative range taking the diopter at infinite object distance for the imaging optical system as zero.

2. An imaging optical system for endoscopes to be arranged after an image transmitting optical system for re-imaging an image formed by an endoscope equipped with an objective lens system and said image transmitting optical system for transmitting an image formed by said objective lens system to a predetermined location, said imaging optical system comprising, in order from the object side:

a first positive lens unit having a positive refractive power as a whole, said first positive lens unit including a front subunit having a positive refractive power and a rear subunit having a positive refractive power, a second lens unit having a negative refractive power and movable in a definite direction along the optical axis so as to progressively enhance magnification of the imaging optical system when focal length of the optical system is varied from the wide position to the tele position, and a third lens unit having a positive refractive power and moved along the optical axis for keeping the image point constant regardless of the variations of the focal length, wherein said rear subunit is movable independently of the other lens units so as to allow focusing even when dioptric power varies within a positive-to-negative range taking the diopter at infinite object distance for said imaging optical system as zero.

3. An imaging optical system for endoscopes according to claim 1 or 2 wherein said first lens unit is designed so as to satisfy the following condition (1):

$$0.5 < f_W/f_1 < 2 \qquad (1)$$

wherein the reference symbol $f_1$ represents the focal length of the first lens unit and the reference symbol $f_W$ designates the focal length of the imaging optical system as a whole at the wide position thereof.

4. An imaging optical system for endoscopes according to claim 2 wherein the first lens unit is designed so as to satisfy the following condition (2):

$$0 < d_f'/d_f < 20\,(10/f_W) \qquad (2)$$

wherein the reference symbol $d_f'$ represents the distance for which the first lens unit is movable, the reference symbol $d_f$ designates the moving distance of the first lens unit per diopter and the reference symbol $20)10/f_W)$ means that the upper limit of this condition is effective when $f_W$, the focal length at the wide position, is normalized to 10.

5. An imaging optical system for endoscopes according to claim 2 wherein the third lens unit is designed so as to satisfy the following condition (3):

$$1 < f_B/f_3 < 3 \qquad (3)$$

wherein the reference symbol $f_3$ represents the focal length of the third lens unit and the reference symbol $f_B$ designates the optical path length as measured from the third lens unit to the image surface.

6. An imaging optical system for endoscopes according to claim 2 wherein the second lens unit comprises a cemented doublet, and is designed so as to satisfy the following conditions (4) and (5):

$$|\Delta n = | \geq 0.15 \qquad (4)$$

$$|\Delta \nu| \geq 14 \qquad (5)$$

wherein the reference symbol $\Delta n$ represents the difference between the refractive indices of the two lens elements comprising the cemented doublet used in the second lens unit, and the reference symbol $\Delta \nu$ designates the difference between the Abbe's numbers of the two lens elements comprising the cemented doublet used in the second lens unit.

7. An imaging optical system for endoscopes to be arranged after an eyepiece lens system for re-imaging an image formed by an endoscope equipped with an objective lens system, an image transmitting optical system for transmitting an image formed by the objective lens system to a predetermined location and said eyepiece lens system, said imaging optical system comprising in order from the object side:

a first positive lens unit having a focusing function, a second negative lens unit having a negative refractive power and moved in a definite direction along the optical axis so as to progressively enhance magnification of the imaging optical system when a focal length of the imaging optical system is varied from the wide position to the tele position, and a third lens unit having a positive refractive power and moved along the optical axis so as to keep the image point constance regardless of variation of focal length, wherein said first lens unit is movable independently of the other lens units so as to allow focusing even when dioptric power varies within a positive-to-negative range taking the diopter at infinite object distance for the imaging optical system as zero, wherein the first lens unit satisfies the following condition (2):

$$0 < d_f/d_f < 20 \ (10/f_W) \qquad (2)$$

wherein the reference symbol $d_f$ represents the distance for which the first lens unit is movable, the reference symbol $d_f$ designates the moving distance of the first lens unit per diopter and the reference symbol $20(10/f_W)$ means that the upper limit of this condition is effective when $f_w$, the focal length at the wide position, is normalized to 10.

8. An imaging optical system for endoscopes to be arranged after an eyepiece lens system for re-imaging an image formed by an endoscope equipped with an objective lens system, an image transmitting optical system for transmitting an image formed by the objective lens system to a predetermined location and said eyepiece lens system, said imaging optical system comprising in order from the object side:

a first positive lens unit having a focusing function, a second negative lens unit having a negative refractive power and moved in a definite direction along the optical axis so as to progressively enhance magnification of the imaging optical system when a focal length of the imaging optical system is varied from the wide position to the tele position, and a third lens unit having a positive refractive power and moved along the optical axis so as to keep the image point constant regardless of variation of focal length, wherein said first lens unit is movable independently of the other lens units so as to allow focusing even when dioptric power varies within a positive-to-negative range taking the diopter at infinite object distance for the imaging optical system as zero, and wherein the third lens unit satisfies the following condition (3):

$$1 < f_B/\beta < 3 \qquad (3)$$

wherein the reference symbol $f_3$ represents the focal length of the third lens unit and the reference symbol $f_B$ designates the optical path length as measured from the third lens unit to the image surface.

9. An imaging optical system for endoscopes to be arranged after an eyepiece lens system for re-imaging an image formed by an endoscope equipped with an objective lens system, an image transmitting optical system for transmitting an image formed by the objective lens system to a predetermined location and said eyepiece lens system, said imaging optical system comprising in order from the object side:

a first positive lens unit having a focusing function, a second negative lens unit having a negative refractive power and moved in a definite direction along the optical axis so as to progressively enhance magnification of the imaging optical system when a focal length of the imaging optical system is varied from the wide position to the tele position, and a third lens unit having a positive refractive power and moved along the optical axis so as to keep the image point constant regardless of variation of focal length, wherein said first lens unit is movable independently of the other lens units so as to permit performing focusing even when dioptric power varies within a positive-to-negative range taking the diopter at infinite object distance for the imaging optical system as zero, wherein the second lens unit includes cemented doublet and satisfies the following conditions (4) and (5):

$$|\Delta n| \geq 0.15 \qquad (4)$$

$$|\Delta \nu| \geq 14 \qquad (5)$$

wherein the reference symbol $\Delta n$ represent the difference between the refractive indices of the two lens elements comprising the cemented doublet used in the second lens unit, and the reference symbol $\Delta \nu$ designates the difference between the Abbe's numbers of the two lens elements comprising the cemented doublet used in the second lens unit.

* * * * *